US012610234B2

(12) United States Patent
Chin

(10) Patent No.: US 12,610,234 B2
(45) Date of Patent: Apr. 21, 2026

(54) APPARATUS AND METHOD OF COMMUNICATION

(71) Applicant: GUANGDONG OPPO MOBILE TELECOMMUNICATIONS CORP., LTD., Guangdong (CN)

(72) Inventor: Chenho Chin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 198 days.

(21) Appl. No.: 18/060,558

(22) Filed: Nov. 30, 2022

(65) Prior Publication Data

US 2023/0104238 A1 Apr. 6, 2023

Related U.S. Application Data

(63) Continuation of application No. PCT/CN2020/104484, filed on Jul. 24, 2020.

(51) Int. Cl.
*H04L 29/06* (2006.01)
*H04W 12/062* (2021.01)

(52) U.S. Cl.
CPC ................................. *H04W 12/062* (2021.01)

(58) Field of Classification Search
CPC ... H04W 12/062; H04W 12/06; H04W 48/16; H04W 76/50; H04L 63/10
See application file for complete search history.

(56) References Cited

U.S. PATENT DOCUMENTS

| | | | | |
|---|---|---|---|---|
| 11,166,326 | B2* | 11/2021 | Padebettu | ........... H04W 92/045 |
| 2015/0296378 | A1* | 10/2015 | Plestid | ................... H04W 8/12 |
| | | | | 455/411 |
| 2015/0336669 | A1 | 11/2015 | Kantor et al. | |
| 2016/0035054 | A1 | 2/2016 | Branscomb et al. | |
| 2016/0125740 | A1 | 5/2016 | Pasko et al. | |

(Continued)

FOREIGN PATENT DOCUMENTS

| | | |
|---|---|---|
| CN | 109964509 A | 7/2019 |
| CN | 111385759 A | 7/2020 |

(Continued)

OTHER PUBLICATIONS

3GPP Meeting, TSG-CTI Meeting #123-e C1-202430, "Release PDU session due to revocation from AAA server, re-auth failure", Apr. 16-24, 2020 (Year: 2020).*

(Continued)

*Primary Examiner* — Yogesh Paliwal

(74) *Attorney, Agent, or Firm* — Hodgson Russ LLP

(57) ABSTRACT

An apparatus and a method of communication are provided. The method includes receiving a failure indication from a system if the system determines that a request of a mobile device to obtain an unmanned aerial system (UAS) service has failed at an authentication, an authorization, and/or a registration. This can provide a failure indication from a system when an authentication, an authorization, and/or a registration from a mobile device to the system fails. The system includes a UAS service supplier (USS) and/or a UAS traffic management (UTM). The mobile device comprises a user equipment and/or an unmanned aerial vehicle (UAV). The network comprises a 3GPP network.

11 Claims, 5 Drawing Sheets

(56)                References Cited

U.S. PATENT DOCUMENTS

| | | | | |
|---|---|---|---|---|
| 2016/0300495 | A1 | 10/2016 | Kantor et al. | |
| 2020/0053083 | A1 | 2/2020 | Kunz et al. | |
| 2020/0162919 | A1 | 5/2020 | Velev et al. | |
| 2020/0336901 | A1* | 10/2020 | Zhu | G08G 5/0026 |
| 2021/0258316 | A1* | 8/2021 | Liu | H04L 63/0876 |
| 2021/0259045 | A1* | 8/2021 | Prabhakar | G08G 5/22 |

FOREIGN PATENT DOCUMENTS

| | | |
|---|---|---|
| CN | 111436050 | 7/2020 |
| EP | 3668126 A1 | 6/2020 |
| EP | 3902304 A1 | 10/2021 |
| WO | 2017202466 | 11/2017 |
| WO | 2018189576 A1 | 10/2018 |
| WO | 2019047066 A1 | 3/2019 |
| WO | 2019149182 A1 | 8/2019 |
| WO | 2020033905 A1 | 2/2020 |
| WO | 2020124322 A1 | 6/2020 |
| WO | 2020143569 A1 | 7/2020 |
| WO | 2020211855 A1 | 10/2020 |
| WO | 2021041143 A1 | 3/2021 |
| WO | 2021041214 A1 | 3/2021 |
| WO | 2021163463 A1 | 8/2021 |
| WO | 2021173583 A1 | 9/2021 |

OTHER PUBLICATIONS

WIPO, International Search Report and Written Opinion for PCT/CN2020/104484, Apr. 23, 2021.

Qualcomm Incorporated et al., "KI#1, KI#2, KI#3, KI#7, New Sol: Solution for UAV authentication and authorization by USS/UTM," SA WG2 Meeting #139e, S2-2004672 (revision of S2-2003798), Jun. 2020.

CATT, "KI #2&3, New Sol: Authentication and authorization for UAV and UAVC," 3GPP TSG-SA WG2 Meeting #139E, S2-2004079 (revision of S2-200xxxx), Jun. 2020.

Ericsson et al., "Key Issues #1, 2, 3, 7: Solution for Authentication and Authorization of UAV," SA WG2 Meeting #139E, S2-2004671 (revision of S2-2003717r06), Jun. 2020.

OPPO, "KI#2, New Solution: Provision of UAV characteristics and issuing of Assigned ID," 3GPP TSG SA WG2 Meeting #139E, S2-2004676 (was S2-2003728r06), Jun. 2020.

Qualcomm Incorporated et al., "KI#1, KI#2, KI#3, KI#7, New Sol: Solution for UAV authentication and authorization by USS/UTM," SA WG2 Meeting #139e, S2-2003798 (revision of S2-200xxxx), Jun. 2020.

Huawei et al., "KI#1 KI#2 KI#5, New Sol: Additional CP-based Authentication and Authorisation," 3GPP TSG-WG SA2 Meeting #139E e-meeting, S2-2004673 (revision of S2-2004002), Jun. 2020.

Apple, "KI #5, New Sol: UAV Authorisation revocation by UTM," SA WG2 Meeting #139E, S2-2003749 (revision of S2-200xxxx), Jun. 2020.

Huawei et al., "KI#6, New Sol: UAS authorization considering association of the UAV and UAV controller," 3GPP TSG-SA WG2 Meeting #139E e-meeting, S2-2004007 (revision of S2-2000682), Jun. 2020.

Ericsson, "Key Issues #1, 2, 3, 7: Solution for Authentication and Authorization of UAV," SA WG2 Meeting #139E, S2-2003717, Jun. 2020.

"3rd Generation Partnership Project; Technical Specification Group Core Network and Terminals; Non-Access-Stratum (NAS) functions related to Mobile Station (MS) in idle mode (Release 16)," 3GPP TS 23.122, Mar. 2020, v16.5.0.

"3rd Generation Partnership Project; Technical Specification Group Services and System Aspects; General Packet Radio Service (GPRS) enhancements for Evolved Universal Terrestrial Radio Access Network (E-UTRAN) access (Release 16)," 3GPP TS 23.401, Dec. 2019, v16.5.0.

"3rd Generation Partnership Project; Technical Specification Group Services and System Aspects; System architecture for the 5G System (5GS); Stage 2 (Release 16)," 3GPP TS 23.501, Jul. 2020, v16.5.0.

"3rd Generation Partnership Project; Technical Specification Group Core Network and Terminals; Non-Access-Stratum (NAS) protocol for 5G System (5GS); Stage 3; (Release 16)," 3GPP TS 24.501, Jun. 2020, v16.5.0.

"3rd Generation Partnership Project; Technical Specification Group Core Network and Terminals; Non-Access-Stratum (NAS) protocol for Evolved Packet System (EPS); Stage 3 (Release 16)," 3GPP TS 24.301, Jun. 2020, v16.5.0.

"3rd Generation Partnership Project; Technical Specification Group Radio Access Network; NR; Radio Resource Control (RRC) protocol specification (Release 16)," 3GPP TS 38.331, Jun. 2021, v16.5.0.

"3rd Generation Partnership Project; Technical Specification Group Radio Access Network; Evolved Universal Terrestrial Radio Access (E-UTRA); Radio Resource Control (RRC); Protocol specification (Release 16)," 3GPP TS 36.331, Jun. 2021, v16.5.0.

EPO, Extended European Search Report for EP Application No. 20945854.6, Jun. 5, 2023.

CNIPA, Notice of Priority Examination of Patent Application issued for CN Application No. 202080103009.9, Apr. 25, 2024.

CNIPA, First Office Action issued for CN Application No. 202080103009.9, May 11, 2024.

EPO, Office Action issued for EP Application No. 20945854.6, Feb. 22, 2024.

InterDigital, "Solution for UAV Authentication and Authorization by USS/UTM using key bootstrapping based on 3GPP credentials," SA WG2 Meeting #139e, S2-2004166 (revision of S2-200xxxx), Jun. 2020.

EPO, Communication for EP Application No. 20945854.6, Aug. 16, 2024.

CNIPA, Second Office Action for CN Application No. 202080103009.9, Jul. 26, 2024.

CNIPA, Notification to Grant Patent Right for Invention for CN Application No. 202080103009.9, Oct. 12, 2024.

* cited by examiner

30
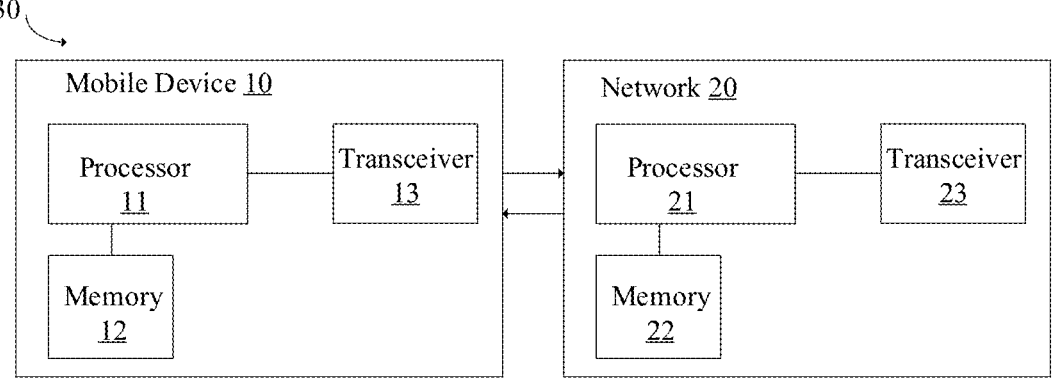
FIG. 3
200
202
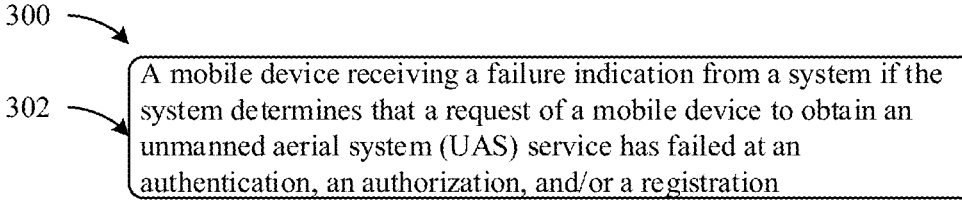
FIG. 4
300
302
A mobile device receiving a failure indication from a system if the system determines that a request of a mobile device to obtain an unmanned aerial system (UAS) service has failed at an authentication, an authorization, and/or a registration
FIG. 5

700

APPARATUS AND METHOD OF COMMUNICATION

CROSS-REFERENCE TO RELATED APPLICATION

This application is a continuation of International Application No. PCT/CN2020/104484, filed Jul. 24, 2020, the entire disclosure of which is incorporated herein by reference.

BACKGROUND OF DISCLOSURE

1. Field of Disclosure

The present disclosure relates to the field of communication systems, and more particularly, to an apparatus and a method of communication.

2. Description of Related Art

Federal aviation administration (FAA) and national aeronautics and space administration (NASA) are defining an unmanned aerial vehicle (UAV) traffic management (UTM) system. The UTM system seeks to present an effective management structure for UAV traffic. In this vein, the UTM is sought to act as an enabler to promote widespread use of UAVs in both commercial and recreational settings while at the same time minimizing the perils to manned air traffic and surrounding pieces of infrastructure. The UTM system is designed to work autonomously, with no active human air traffic controller constantly supervising and monitoring the airspace. Wide-area connectivity enhances the safety and control of UAV navigation, which is critically important for UAV use cases to gain wide acceptance by consumers, regulators, and various industry sectors who have interests in using UAVs for different purposes.

UAV connectivity serves two major purposes. The first major purpose is for command and control of the UAV. In most use cases, a UAV can fly autonomously, from a starting point to a destination. However, providing remote control can significantly enhance the safety and control of a UAV. For example, if there is a change of the flight path of the UAV due to traffic management, it is essential that such information is communicated to the UAV. Accordingly, command and control functionality are essential for supporting UAV traffic management. The second major purpose is for providing data communications with/for the UAV. For example, use cases like flying cameras and remote surveillance require a UAV to send back real-time/live telemetry data, pictures, and/or videos.

Well established, ubiquitous cellular networks can best provide wide-area connectivity for supporting UAV missions. This wide-area connectivity is made possible through seamless handovers between cells in the cellular network. These seamless handovers ensure that during the duration of a UAV mission, a UAV can be served by a cell with the required reliability and quality of service (QoS). For example, a UAV initially served by cell A may after a certain point be handed over to cell B. In this example, cell A is referred to as the source cell and cell B is referred to as the target cell. Handover in a 3rd Generation Partnership Project (3GPP) network is enabled through user equipment (UE) measurements (i.e., UAV measurements). For example, a UE/UAV is given a neighbor cell list and the UE/UAV performs reference signal received power (RSRP) or reference signal received quality (RSRQ) measurements for each cell in the neighbor cell list. The measurements are based on known reference signals transmitted by these cells and detected by the UE/UAV. In the meantime, the quality of service of the source/serving cell is measured. A handover process is triggered when the QoS on the source/serving cell to the UE/UAV, as indicated by the UE/UAV measurements, drops below a certain threshold and/or when the UE/UAV measurements for a neighbor cell in the neighbor cell list (e.g., the target cell) exceeds a certain threshold.

If UAV's authentication, authorization, and/or registration by and/or to UAS service supplier (USS)/UTM fails, how a 3GPP system does with a UAV's 3GPP registration or with the UAV itself may be a challenging issue. Thus, improvements in the field are desired. Therefore, there is a need for an apparatus and a method of communication.

SUMMARY

An object of the present disclosure is to propose an apparatus and a method of communication, which can provide a failure indication from a system when an authentication, an authorization, and/or a registration from a mobile device to the system fails.

In a first aspect of the present disclosure, a method of communication of a network comprises receiving a failure indication from a system if the system determines that a request of a mobile device to obtain an unmanned aerial system (UAS) service has failed at an authentication, an authorization, and/or a registration.

In a second aspect of the present disclosure, a network of communication includes a memory, a transceiver, and a processor coupled to the memory and the transceiver. The transceiver is configured to receive a failure indication from a system if the system determines that a request of a mobile device to obtain an unmanned aerial system (UAS) service has failed at an authentication, an authorization, and/or a registration.

In a third aspect of the present disclosure, a method of communication of a mobile device comprises receiving a failure indication from a system if the system determines that a request of a mobile device to obtain an unmanned aerial system (UAS) service has failed at an authentication, an authorization, and/or a registration.

In a fourth aspect of the present disclosure, a mobile device of communication includes a memory, a transceiver, and a processor coupled to the memory and the transceiver. The transceiver is configured to receive a failure indication from a system if the system determines that a request of a mobile device to obtain an unmanned aerial system (UAS) service has failed at an authentication, an authorization, and/or a registration.

In a fifth aspect of the present disclosure, a non-transitory machine-readable storage medium has stored thereon instructions that, when executed by a computer, cause the computer to perform the above methods.

In a sixth aspect of the present disclosure, a chip includes a processor, configured to call and run a computer program stored in a memory, to cause a device in which the chip is installed to execute the above methods.

In a seventh aspect of the present disclosure, a computer readable storage medium, in which a computer program is stored, causes a computer to execute the above methods.

In an eighth aspect of the present disclosure, a computer program product includes a computer program, and the computer program causes a computer to execute the above methods.

In a ninth aspect of the present disclosure, a computer program causes a computer to execute the above methods.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 3 is a block diagram of a mobile device and a network of communication in a communication network system according to an embodiment of the present disclosure.

FIG. 4 is a flowchart illustrating a method of communication of a network according to an embodiment of the present disclosure.

FIG. 5 is a flowchart illustrating a method of communication of a mobile device according to an embodiment of the present disclosure.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment and does not limit the disclosure.

In some embodiments, where and when in the present disclosure, the mention of "3GPP system" or "3GPP network" is made, what is inferred is system architecture evolution (SAE)/evolved packet system (EPS) and/or a 5GS (5G system) as defined in TS 23.401 and TS 23.501 respectively. When methods, solutions, and embodiments in the present disclosure describes, proposes, and/or introduces actions or decisions by or in the 3GPP system, such descriptions, proposals, and/or introductions can apply without mention to one or more or a combination of entities within the 3GPP system or 3GPP network as it is presently indicated or aligned in the course of 3GPP SA2's work on Release 17 work items.

Figure 1:
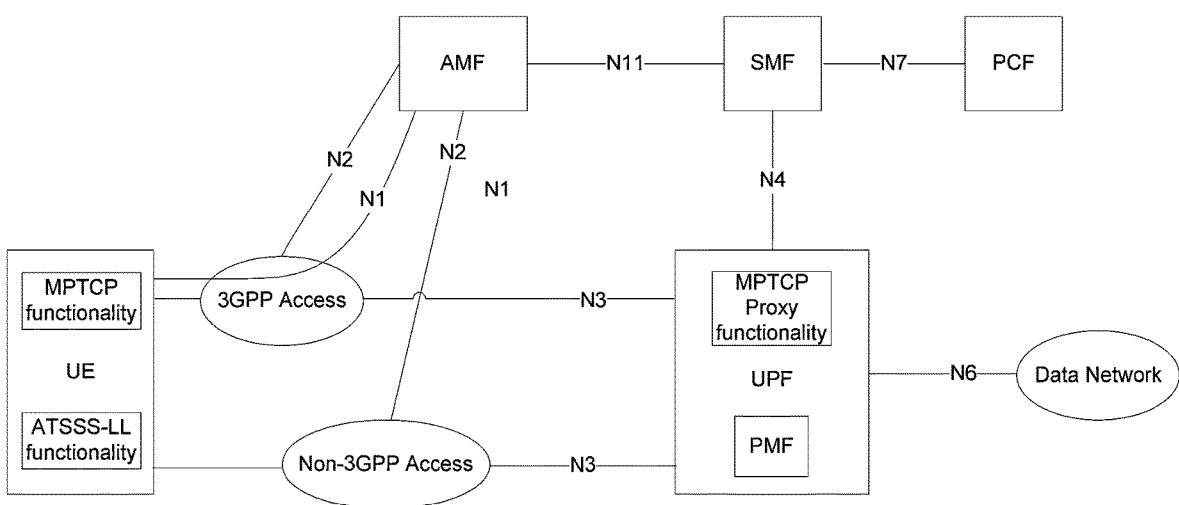
FIG. 1 is a schematic diagram of a 3GPP system and network entities within the 3GPP system.

FIG. 1 illustrates a 3GPP system and network entities within the 3GPP system. The 3GPP system may be defined in TS 23.501. FIG. 1 illustrates that a component/entity makeup of a 3GPP 5GS system, new or renamed entities or entities with new or changed or expanded functionalities might be introduced or changed. Thus, the latest dated versions of TS 23.501 and TS 23.401 should be referred to for fuller details.

Figure 2:
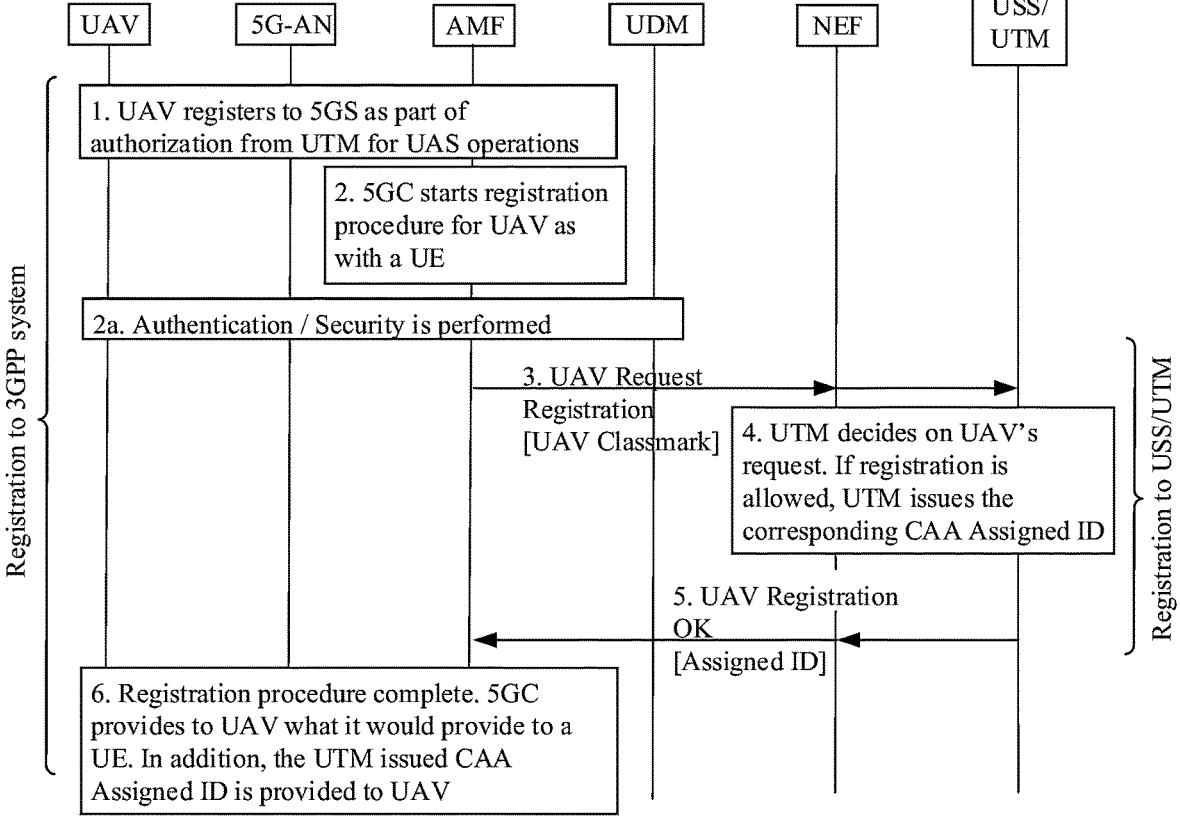
FIG. 2 is a schematic diagram illustrating a registration to 3GPP system and a registration to USS/UTM.

FIG. 2 illustrates a registration to 3GPP system and a registration to USS/UTM. FIG. 2 describes methods where a UAV in accessing and registering to a 3GPP system leads the 3GPP system as a consequence of that registration to 3GPP and/or a follow up of the registration to 3GPP, contact the USS/UTM, so that the UAV then registers to the USS/UTM for UAS reasons/purposes. One such UAS purpose could be the USS/UTM allocating to the UAV an assigned ID which is used for remote identification and tracking (otherwise commonly known as remote ID, or RID).

Within 3GPP SA2 community and out of SA2#139E (1 Jun. to 12 Jun. 2020), the term CAA_Level UAV ID has been adopted as a name of the assigned ID. This aspect can be summarized by FIG. 2, (taken from S2-2004676 with added illustration) between registering to 3GPP system and registering to USS/UTM. In SA2#139E, in the discussions prior to approval of S2-2004676, questions were raised on what should or could happen if the 3GPP registration is successful but the USS/UTM registration fail for whatever reasons. Would the failure to successfully complete the USS/UTM registration aspects lead to also failure of the 3GPP registration. Thus, so far, exception cases, error cases, and abnormal cases are left open. Such open and unanswered questions remain for other solutions approved at SA2#139E for the UAS work item. For instance, in S2-2004672, the proposal there is the registration to 3GPP system is done and completed first and then subsequently, the UAV can use secondary authentication methods and through establishing user plane to USS/UTM, perform and application to application registration (in S2-2004672, the terminology is authorization/authentication while in FIG. 2 and here in some embodiments of the present disclosure use the term USS/UTM registration—or registration to USS/UTM). Therefore, it is an open issue if the 3GPP registration is completed successfully while the secondary authentication (for USS/UTM) fails. To that end the following editor's note is placed into S2-2004672. Editor's note: It is FFS whether the UAV can remain registered in 3GPP system if the UUAA fails. Thus, it is unspecified, unknown, what the 3GPP system should do with the UAV's 3GPP registration or with the UAV itself, if the UAV's authentication/authorization/registration by/to the USS/UTM fails (for whatever reason).

FIG. 3 illustrates that, in some embodiments, a mobile device 10 and a network 20 of communication in a communication network system 30 according to an embodiment of the present disclosure are provided. The communication network system 30 includes the mobile device 10 and the network 20. The mobile device 10 may include a memory 12, a transceiver 13, and a processor 11 coupled to the memory 12, the transceiver 13. The network 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the transceiver 23 is configured to receive a failure indication from a system if the system determines that a request of the mobile device 10 to obtain an unmanned aerial system (UAS) service has failed at an authentication, an authorization, and/or a registration. This can provide a failure indication from a system when an authentication, an authorization, and/or a registration from a mobile device to the system fails.

In some embodiments, the transceiver 13 is configured to receive a failure indication from a system if the system determines that a request of the mobile device 10 to obtain an unmanned aerial system (UAS) service has failed at an authentication, an authorization, and/or a registration. This can provide a failure indication from a system when an authentication, an authorization, and/or a registration from a mobile device to the system fails.

FIG. 4 illustrates a method 200 of communication of a network according to an embodiment of the present disclosure. In some embodiments, the method 200 includes: a block 202, a network receiving a failure indication from a system if the system determines that a request of a mobile device to obtain an unmanned aerial system (UAS) service has failed at an authentication, an authorization, and/or a registration. This can provide a failure indication from a system when an authentication, an authorization, and/or a registration from a mobile device to the system fails.

FIG. 5 illustrates a method 300 of communication of a mobile device according to an embodiment of the present disclosure. In some embodiments, the method 300 includes: a block 302, a mobile device receiving a failure indication from a system if the system determines that a request of a mobile device to obtain an unmanned aerial system (UAS) service has failed at an authentication, an authorization, and/or a registration. This can provide a failure indication from a system when an authentication, an authorization, and/or a registration from a mobile device to the system fails.

In some embodiments, the mobile device 10 receives the failure indication from the network 20 if the authentication, the authorization, and/or the registration is a follow on or a concatenation of a 3rd generation partnership project (3GPP) registration. In some embodiments, when the 3GPP registration completes successfully but the authentication, the authorization, and/or the registration to the system fails, the network 20 decides whether to allow or not allow the mobile device 10 to continue to access the network 20. In some embodiments, the network 20 decides whether to allow or not allow the mobile device 10 to continue to access the network based on at least one or a combination of the followings: an operator policy, service level agreements, policy rules for the mobile device provided by the system, a 3GPP subscription of the mobile device for 3GPP services, or implementation options in the network. In some embodiments, when the 3GPP registration completes successfully but the authentication, the authorization, and/or the registration to the system fails, if the authentication, the authorization, and/or the registration to the system is done as a part of the 3GPP registration, the network 20 rejects the 3GPP registration of the mobile device 10. In some embodiments, the network 20 rejects the 3GPP registration of the mobile device 10 with a new reject cause or an existing reject cause.

In some embodiments, when the 3GPP registration completes successfully but the authentication, the authorization, and/or the registration to the system fails, if the authentication, the authorization, and/or the registration to the system is done separate or as standalone from the 3GPP registration, the network 20 rejects the 3GPP registration of the mobile device 10 by commanding the mobile device 10 with a de-registration request, or the network commands the mobile device 10 to detach by sending a detach request, or the network 20 commands the mobile device 10 that the 3GPP registration has been terminated by transmitting an existing non-access stratum (NAS) message, a new NAS message, or a session management message.

In some embodiments, when the 3GPP registration completes successfully but the authentication, the authorization, and/or the registration to the system fails, the network 20 keeps the mobile device 10 registered to the network 20 for 3GPP services that the mobile device 10 is entitled to as a part of the 3GPP registration. In some embodiments, when the 3GPP registration completes successfully but the authentication, the authorization, and/or the registration to the system fails, a failure of the authentication, the authorization, and/or the registration to the system is indicated back to the mobile device 10 along with a cause value indicating the failure of the authentication, the authorization, and/or the registration to the system. In some embodiments, the failure of the authentication, the authorization, and/or the registration to the system is indicated back to the mobile device 10 in an existing NAS message, a new NAS message, or a session management message.

In some embodiments, the existing NAS message indicating the failure of the authentication, the authorization, and/or the registration to the system comprises a registration accept, a registration reject, a service reject, or a message over a control plane meant for an application of the mobile device 10. In some embodiments, the application of the mobile device 10 comprises a configuration update of the mobile device 10. In details, the configuration update of the mobile device 10 may be a UE configuration update. The configuration update of the mobile device 10 can refer to a possible NAS message. That message can be a method to carry the indication of failure. In some embodiments, the session management message indicating the failure of the authentication, the authorization, and/or the registration to the system comprises a protocol data unit (PDU) session release command to release a PDU session associated or corresponding to the system. In some embodiments, the PDU session release command is associated to a slice or a network slice selection assistance information (NSSAI) that serves the system or serves the UAS service. In some embodiments, a cause for a release of resources of the PDU session release command is associated or corresponding to a reject cause of the 3GPP registration. In some embodiments, the reject cause of the 3GPP registration indicated back to the mobile device 10 comprises a newly introduced cause value indicating a reason that the mobile device 10 is rejected by the system for a requested service related to the UAS service.

In some embodiments, the reject cause of the 3GPP registration indicated back to the mobile device 10 comprises an existing cause value expanded to cover the failure of the authentication, the authorization, and/or the registration to the system. In some embodiments, the authentication, the authorization, and/or the registration is through a user plane established through the network. In some embodiments, the system comprises a UAS service supplier (USS) and/or a UAS traffic management. In some embodiments, the mobile device 10 comprises a user equipment and/or an unmanned aerial vehicle (UAV). In some embodiments, the network 20 comprises a 3GPP network.

In some embodiments, if the mobile device 10 receives a registration reject with a new reject cause or an existing reject cause, the new reject cause or the existing reject cause is indicated to an application layer that is an application client of the mobile device 10. In some embodiments, if the mobile device 10 receives a registration reject with a new reject cause or an existing reject cause, the mobile device 10 enters a deregistered state and awaits user and/or application level instructions or intervention. In some embodiments, if the mobile device 10 receives a registration reject with a new reject cause or an existing reject cause, the mobile device 10 registers to a 3GPP system as a 3GPP mobile device with a 3GPP subscription and credentials.

In some embodiments, if the mobile device 10 receives a registration accept but with a new reject cause or an existing reject cause, the new reject cause or the existing reject cause is indicated to an application layer that is an application client of the mobile device 10. In some embodiments, if the mobile device receives a registration accept but with a new reject cause or an existing reject cause, when the 3GPP registration has been accepted, the mobile device 10 behaves as a 3GPP mobile device conforming to a 3GPP specification excluding using UAS related features, signaling, procedures, and/or services. In some embodiments, if the mobile device 10 receives a registration accept but with a new reject cause or an existing reject cause, when the 3GPP registration has been accepted, the mobile device 10 stays in a registered state and performs NAS and radio resource control (RRC) procedures in the 3GPP specification. In some embodiments, if the mobile device is triggered by an application layer, the mobile device 10 initiates PDU sessions related to UAS features, signaling, procedures, and/or services.

In some embodiments, if the mobile device 10 is told to de-register or told to detach itself, a client application of the mobile device 10 and/or a user is informed after the mobile device 10 goes into de-register or detach itself, releasing resources that the mobile device 10 has been assigned or allocated and stays de-registered waiting for upper layers or user intervention. In some embodiments, upon de-registration or detach, the mobile device 10 while waiting for an upper layer or user intervention to decide on next steps, the mobile device 10 executes camping and selection procedures required of a 3GPP mobile device according to 3GPP specifications. In some embodiments, if the mobile device is told to de-register or told to detach itself, the mobile device 10 registers to a 3GPP system as a 3GPP mobile device with a 3GPP subscription and credentials.

In some embodiments, if the mobile device 10 receives a PDU session release command for an application level attempt at an application of the mobile device 10 to the authentication, the authorization, and/or the registration of an application of the system, the mobile device 10 releases resources for a PDU session that the network 20 has commanded to be released and awaits action and/or reaction by and/or from upper layers. In some embodiments, if a reason for the release is given to the mobile device 10 by the network 20 for the release of the PDU session, which can be considered as a reject cause, and the reject cause is given to upper layers and/or be displayed to a user by a man-machine interface (MMI). This display by the MMI to the user may be in the received form from the system or translated and elaborated to human readable and comprehensible form.

Some embodiments of the present disclosure propose methods for a network side and a mobile device/UE/UAV side to resolve or at least mitigate the issues indicated in previous section. For the USS/UTM, if the USS/UTM decides that UAV request to obtain UAS service has failed at authentication/authorization/registration, the USS/UTM will provide an indication of failure to the UAV and/or to the 3GPP network. In some embodiments, if the USS/UTM's authentication/authorization/registration of the UAV is a follow on (or concatenation of) the 3GPP registration, the USS/UTM can indicate such failure to the 3GPP network from where the 3GPP network will convey the USS/UTM authentication/authorization/registration failure to the UAV.

In some embodiments, if the authentication/authorization/registration of the UAV by/to the USS/UTM is through a user plane established through the 3GPP system, i.e. UAV's client application to USS/UTM's server application level communication exchanges, that indication of failure can be provided directly to the UAV. A failure in such a scenario (where UAV to/from USS/UTM is at application level) regardless, will be indicated by USS/UTM to the 3GPP network. In either of above cases, that failure indication communicated to the 3GPP network by the USS/UTM can be the hereafter referred to reject cause used by the 3GPP system towards the UAV or that indication can be mapped or translated to the hereafter mentioned reject cause or reason of failure.

In some embodiments, on a 3GPP network side, when the UAV's 3GPP registration completes successfully but the registration/authorization/authentication to the USS/UTM fails for whatever reason, the 3GPP network/system decides to allow or not allow the UE continued access to the 3GPP system as a UE successfully registered to 3GPP based on operator policy, service level agreements, policy rules for that UE provided by the USS/UTM, UE's 3GPP subscription for 3GPP services, for example, according to such subscription profile the entitled services might be nothing more than just not able to access UAS services or slices related to UAS, implementation options in the network side, or a combination of the above.

In some embodiments, when the UAV's 3GPP registration completes successfully but the registration/authorization/authentication to the US S/UTM fails for whatever reason: If the authentication/authorization/registration to USS/UTM is done as part of the 3GPP registration procedure, the 3GPP network will reject the UAV's 3GPP registration. The rejection by the 3GPP system can be by sending REGISTRATION REJECT with a new or existing reject cause. If the authentication/authorization/registration to USS/UTM is done separate (or as standalone) from the 3GPP registration procedure, the 3GPP network will reject the UAV's 3GPP registration by commanding the UAV with a DE-REGISTRATION REQUEST by a network (NW) or can command the UAV to detach by sending a DETACH REQUEST (new to 5GS). Other existing or new NAS messages to convey and/or command the UAV that its 3GPP registration has been terminated are not excluded. Even Session Management messages can be considered, for example, PDU SESSION RELEASE COMMAND.

In some embodiments, when the UAV's 3GPP registration completes successfully but the registration/authorization/authentication to the USS/UTM fails for whatever reason: The 3GPP system keeps the UAV registered to the 3GPP system for 3GPP services the UAV is entitled to as part of that 3GPP registration. The US S/UTM registration/authorization/authentication/access failure is indicated back to the UAV along with a cause value indicating this failure. This indication is provided back to the UAV in any of the present NAS reject messages, an example of which is REGISTRATION ACCEPT, REGISTRATION REJECT, SERVICE REJECT and might even be in NAS messages over the control plane meant for the UAV application such as UE configuration update. In details, the above configuration update of the mobile device 10 may be a UE configuration update. The above configuration update of the mobile device 10 can refer to a possible NAS message. That message can be a method to carry the indication of failure. Likewise, session management messages can possibly be used if it is wished to have a separation between 3GPP registration procedure and USS/UTM authentication/authorization/registration procedure. PDU SESSION RELEASE COMMAND, release the particular PDU session associated or corresponding to the USS/UTM. This may also be associated to the slice or NSSAI that serves the USS/UTM or serves the UAS feature/service. The cause given for this release of resources will correspond to the reject cause as already, or hereafter, elaborated.

In some embodiments, the reject cause indicated back to the UAV can be a newly introduced cause value indicating the reason the UAV is rejected by USS/UTM for requested service related to UAS feature. An example can be e.g. Cause #78—requested UAS services not allowed by USS/UTM. Note that the numerical value of "78" and the text wording of the reject cause are just an example. Any other new numerical value that is not yet in use will suffice. The actual numerical value to use is to be decide by 3GPP CT1 as is also the exact text wording of the reject cause. In some embodiments, the reject cause indicated back to the UAV can be an existing cause value expanded to cover failure of registration/authentication/authorization to/by USS/UTM. An existing reject cause value such as e.g. Cause #33— requested service option not subscribed.

Figure 6:
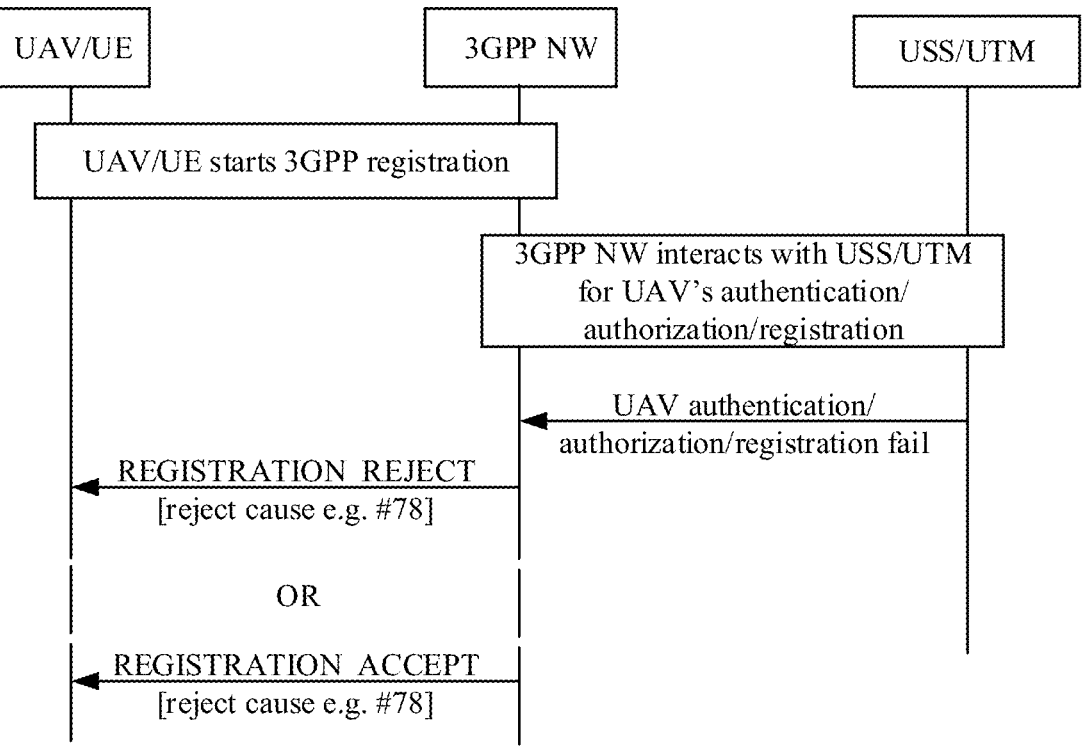
FIG. 6 is a schematic diagram illustrating a registration to 3GPP system according to an embodiment of the present disclosure.

FIG. 6 is a schematic diagram illustrating a registration to 3GPP system according to an embodiment of the present disclosure. FIG. 6 illustrates some examples of the protocol signaling of above methods. Such examples are by no means exhaustive or complete in detail. However, any person skill in the art will be able to derive the necessary details and can deduce other possible signaling. In some embodiments, the method illustrated in FIG. 6 includes: UAV/UE starts 3GPP registration at 3GPP NW, 3GPP NW interacts with USS/UTM for UAV's authentication/authorization/registration, US S/UTM informs that UAV authentication/authorization/registration fails, to 3GPP NW, and 3GPP NW transmits, to UAV/UE, REGISTRATION_REJECT (reject cause e.g. #78) or 3GPP NW transmits, to UAV/UE, REGISTRATION_ACCEPT (reject cause e.g. #78).

Figure 7:
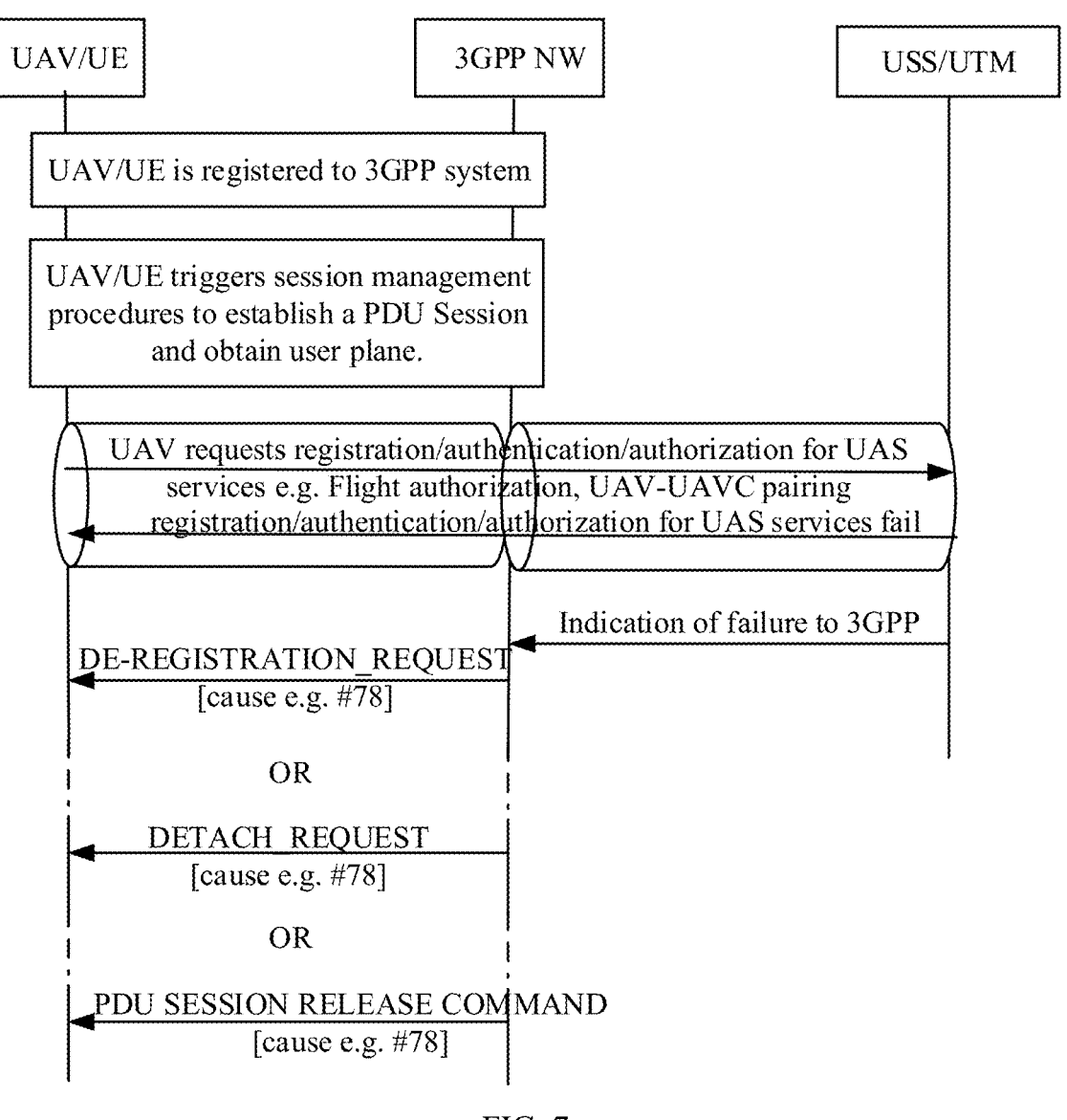
FIG. 7 is a schematic diagram illustrating a registration to 3GPP system according to an embodiment of the present disclosure.

FIG. 7 is a schematic diagram illustrating a registration to 3GPP system according to an embodiment of the present disclosure. FIG. 7 illustrates some examples of the protocol signaling of above methods. Such examples are by no means exhaustive or complete in detail. However, any person skill in the art will be able to derive the necessary details and can deduce other possible signaling. In some embodiments, the method illustrated in FIG. 7 includes: UAV/UE is registered to 3GPP system, UAV/UE triggers session management procedures to establish a PDU session and obtain user plane to communication with USS/UTM, UAV requests registration/authentication/authorization for UAS services e.g. Flight authorization, UAV-UAVC pairing registration/authentication/authorization for UAS services fail, USS/UTM transmits an indication of failure to 3GPP NW, and 3GPP NW transmits, to UAV/UE, DE-REGISTRATION_REQUEST (reject cause e.g. #78) or 3GPP NW transmits, to UAV/UE, DETACH_REQUEST (reject cause e.g. #78) or 3GPP NW transmits, to UAV/UE, PDU SESSION RELEASE COMMAND (reject cause e.g. #78).

In some embodiments, on a UE/UAV/mobile device side: the UE/UAV/mobile receives a REGISTRATION_REJECT with a new or existing reject cause. The reject cause will be indicated to the application layer that is the UAS application client of the UAV. This reject cause decodes to human readable text is provided to the MMI for display to the human user. It is not excluded that the numerical value of the reject code is also displayed as that can serve a more precise indication of the failure should the human user contacts a call center for assistance. The mobile device will enter the DEREGISTERED state and will await user and/or application level instructions or intervention. The mobile device meantime will only be able to support emergency services. As an alternative, and/or in addition to the above methods, the UE attempts just to register to the 3GPP system as a 3GPP UE with its 3GPP subscription and credentials.

In some embodiments, the UE/UAV/mobile device receives a REGISTRATION_ACCEPT but with a new or existing reject cause. The reject cause will be indicated to the application layer that is the UAS application client of the UAV. This reject cause decodes to human readable text is provided to the MMI for display to the human user. It is not excluded that the numerical value of the reject code is also displayed as that can serve a more precise indication of the failure should the human user contacts a call center for assistance. As the UE's 3GPP registration has been accepted, the UE will behave as expected of a 3GPP UE conforming to 3GPP specifications like (and not exhaustively to) TS 24.501 (v16.5.0), TS 24.301 (v16.5.0) excluding using UAS related features, signaling, procedures and services. The UE stays in REGISTERED state and perform the necessary NAS and RRC procedures required of it given in 3GPP specification such as (but not exhaustively) TS 24.501 (v16.5.0), TS 24.301 (v16.5.0), TS 36.331, TS 38.331. The UE is however, if triggered by application layers, initiate PDU sessions related to UAS features, signaling, procedures and services, including knowingly utilizing any of the UAS related slice parameters (such as NSSAIs in its Allowed NSSAI list that are related to UAS feature and/or service).

In some embodiments, if the UE/UAV/mobile is told to de-register or told to detach itself—for instance NW has responded with DE-REGISTRATION REQUEST or DETACH REQUEST or by any other messages denoting to the mobile to de-register or to detach. The UAS (or UAV) client application and/or the user—in any of these cases covers the upper layers as compared to NAS and RRC—is informed after which the mobile shall go into de-register or detach itself, releasing what resources it has been assigned or allocated and stay de-registered waiting for upper layers or user intervention. Upon de-registration or detach, the UE while awaiting for upper layer or user intervention to decide on its next steps, the UE executes the necessary camping and selection procedures required of a 3GPP UE according to 3GPP specifications amongst which are TS 23.122, TS 24.301, TS 24.501, TS 36.331, TS 38.331. As an alternative, and/or in addition to the above methods, the UE attempts just to register to the 3GPP system as a 3GPP UE with its 3GPP subscription and credentials.

In some embodiments, if the UE/UAV/mobile device receives a PDU SESSION RELEASE COMMAND for an application level attempt at UAV application (client) to USS/UTM application (server) registration/authentication/authorization, the UE releases the resources for that PDU Session that the network has commanded to be released and await action/reaction by/from upper layers. If a reason for release is given to the UE by the network for the release of the PDU session—which can be considered as a reject cause—that cause is given to upper layers and/or be displayed to user by the MMI.

All the above identified methods can be used as stand-alone or in conjunction with or even a combination of parts of each. These identified methods are not excluded if the final choice of NAS messages used or reject cause values chosen are different from what has been identified above.

Commercial interests for some embodiments are as follows. 1. Solving issues in the prior art. 2. Providing a failure indication from a system when an authentication, an authorization, and/or a registration from a mobile device to the system fails. 3. Providing a good communication performance. 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure propose technical mechanisms.

Figure 8:
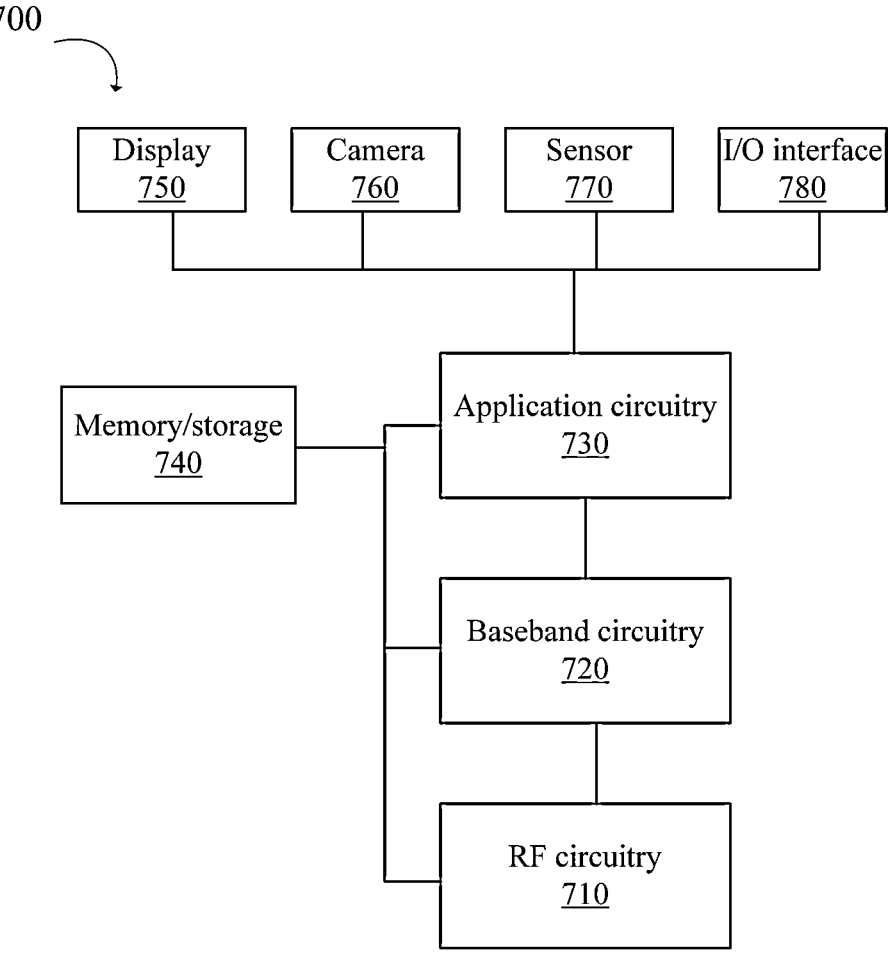
FIG. 8 is a block diagram of a system for wireless communication according to an embodiment of the present disclosure.

FIG. 8 is a block diagram of an example system 700 for wireless communication according to an embodiment of the present disclosure. Embodiments described herein may be implemented into the system using any suitably configured hardware and/or software. FIG. 8 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units. If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

What is claimed is:

1. A method of communication of a network, comprising:

receiving a failure indication from a system in response to the system determining that a request of a mobile device to obtain an unmanned aerial system (UAS) service has failed at an authentication or an authorization by the system, wherein the system comprises at least one of a UAS service supplier (USS) or a UAS traffic management system, and the network comprises a 3rd Generation Partnership Project (3GPP) network;

wherein the method further comprises transmitting the failure indication to the mobile device in response to the authentication or the authorization being a follow on or a concatenation of a 3GPP registration;

wherein when the 3GPP registration completes successfully but the authentication or the authorization fails, the network decides whether to allow or not allow the mobile device to continue to access the network;

wherein the network decides whether to allow or not allow the mobile device to continue to access the network based on an operator policy;

wherein in response to the 3GPP registration completing successfully but the authentication or the authorization by the system failing, a failure of the authentication or authorization is indicated back to the mobile device in a session management message along with a cause value indicating the failure of the authentication or the authorization by the system, the session management message indicating the failure of the authentication or the authorization by the system comprises a protocol data unit (PDU) session release command to release a PDU session associated or corresponding to the system, and the PDU session release command is associated to a slice that serves the system, and the mobile device is not allowed to access the slice that serves the system;

wherein when the 3GPP registration completes successfully but the authentication or the authorization fails, the network deciding whether to allow or not allow the mobile device to continue to access the network comprises:

keeping, by the network, the mobile device registered to the network for 3GPP services that the mobile device is entitled to as a part of the 3GPP registration, and not allowing the mobile device to access a slice related to UAS.

2. The method of claim 1, wherein the network decides whether to allow or not allow the mobile device to continue to access the network further based on at least one or a combination of the followings:

service level agreements;

policy rules for the mobile device provided by the system;

a 3GPP subscription of the mobile device for 3GPP services; or implementation options in the network.

3. The method of claim 1, wherein when the 3GPP registration completes successfully but the authentication or the authorization fails, in response to the authentication or the authorization being done separate or as standalone from the 3GPP registration, the network rejects the 3GPP registration by commanding the mobile device with a de-registration request by transmitting an existing non-access stratum (NAS) message.

4. A network of communication, comprising:

a memory;

a transceiver; and a processor coupled to the memory and the transceiver;

wherein the transceiver is configured to receive a failure indication from a system in response to the system determining that a request of a mobile device to obtain an unmanned aerial system (UAS) service has failed at an authentication or an authorization by the system, wherein the system comprises at least one of a UAS service supplier (USS) or a UAS traffic management system, and the network comprises a 3rd Generation Partnership Project (3GPP) network;

wherein the transceiver is configured to transmit the failure indication to the mobile device in response to the authentication or the authorization being a follow on or a concatenation of a 3GPP registration;

wherein when the 3GPP registration completes successfully but the authentication or the authorization fails, the processor decides whether to allow or not allow the mobile device to continue to access the network;

wherein the processor decides whether to allow or not allow the mobile device to continue to access the network based on an operator policy;

wherein in response to the 3GPP registration completing successfully but the authentication or the authorization by the system failing, a failure of the authentication or authorization is indicated back to the mobile device in a session management message along with a cause value indicating the failure of the authentication or the authorization by the system, the session management message indicating the failure of the authentication or the authorization by the system comprises a protocol data unit (PDU) session release command to release a PDU session associated or corresponding to the system, and the PDU session release command is associated to a slice that serves the system, and the mobile device is not allowed to access the slice that serves the system;

wherein the processor is configured to, when the 3GPP registration completes successfully but the authentication or the authorization fails, keep the mobile device registered to the network for 3GPP services that the mobile device is entitled to as a part of the 3GPP registration, and not allow the mobile device to access a slice related to UAS.

5. The network of claim 4, wherein the processor decides whether to allow or not allow the mobile device to continue to access the network further based on at least one or a combination of the followings:

service level agreements;

policy rules for the mobile device provided by the system;

a 3GPP subscription of the mobile device for 3GPP services; or implementation options in the network.

6. The network of claim 4, wherein when the 3GPP registration completes successfully but the authentication or the authorization fails, in response to the authentication or the authorization being done separate or as standalone from the 3GPP registration, the processor rejects the 3GPP registration by commanding the mobile device with a de-registration request by transmitting an existing non-access stratum (NAS) message.

7. The network of claim 4, wherein the mobile device comprises at least one of a user equipment or an unmanned aerial vehicle (UAV).

8. A mobile device of communication, comprising:

a memory;

a transceiver; and a processor coupled to the memory and the transceiver;

wherein the transceiver is configured to receive a failure indication from a system in response to the system determining that a request of a mobile device to obtain an unmanned aerial system (UAS) service has failed at an authentication or an authorization by the system, wherein the system comprises at least one of a UAS service supplier (USS) or a UAS traffic management system;

wherein the transceiver is configured to receive the failure indication from a network in response to the authentication or the authorization being a follow on or a concatenation of a 3rd Generation Partnership Project (3GPP) registration, and the network comprises a 3GPP network;

wherein when 3GPP registration completes successfully but the authentication or the authorization fails, the network decides whether to allow or not allow the mobile device to continue to access the network;

wherein the network decides whether to allow or not allow the mobile device to continue to access the network based on an operator policy;

wherein in response to the 3GPP registration completing successfully but the authentication or the authorization by the system failing, a failure of the authentication or authorization is indicated back to the mobile device in a session management message along with a cause value indicating the failure of the authentication or the authorization by the system, the session management message indicating the failure of the authentication or the authorization by the system comprises a protocol data unit (PDU) session release command to release a PDU session associated or corresponding to the system, and the PDU session release command is associated to a slice that serves the system, and the mobile device is not allowed to access the slice that serves the system wherein when the 3GPP registration completes successfully but the authentication or the authorization fails, the network keeps the mobile device registered to the network for 3GPP services that the mobile device is entitled to as a part of the 3GPP registration, and does not allow the mobile device to access a slice related to UAS.

9. The mobile device of claim 8, wherein the network decides whether to allow or not allow the mobile device to continue to access the network further based on at least one or a combination of the followings:

service level agreements;

policy rules for the mobile device provided by the system;

a 3GPP subscription of the mobile device for 3GPP services; or implementation options in the network.

10. The mobile device of claim 8, wherein when the 3GPP registration completes successfully but the authentication or the authorization fails, in response to the authentication or the authorization being done separate or as standalone from the 3GPP registration, the network rejects the 3GPP registration of the mobile device by commanding the mobile device with a de-registration request by transmitting an existing non-access stratum (NAS) message.

11. The mobile device of claim 8, wherein the mobile device comprises at least one of a user equipment or an unmanned aerial vehicle (UAV).

* * * * *